US012588072B2

(12) United States Patent
Zhang et al.

(10) Patent No.: US 12,588,072 B2
(45) Date of Patent: Mar. 24, 2026

(54) SYSTEMS AND METHODS FOR INITIAL ACCESS

(71) Applicant: ZTE CORPORATION, Shenzhen (CN)

(72) Inventors: Nan Zhang, Shenzhen (CN); Jianwu Dou, Shenzhen (CN); Wei Cao, Shenzhen (CN); Jianqiang Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 322 days.

(21) Appl. No.: 18/489,541

(22) Filed: Oct. 18, 2023

(65) Prior Publication Data

US 2024/0049301 A1 Feb. 8, 2024

Related U.S. Application Data

(63) Continuation of application No. PCT/CN2021/113697, filed on Aug. 20, 2021.

(51) Int. Cl.
*H04W 74/0833* (2024.01)

(52) U.S. Cl.
CPC .............................. *H04W 74/0833* (2013.01)

(58) Field of Classification Search
CPC ........... H04W 74/0833; H04W 74/002; H04W 72/0446; H04W 72/0453; H04W 72/51; H04W 72/56
See application file for complete search history.

(56) References Cited

U.S. PATENT DOCUMENTS

| | | | |
|---|---|---|---|
| 2018/0343043 A1 | 11/2018 | Hakola et al. | |
| 2020/0015266 A1 | 1/2020 | Yan et al. | |
| 2020/0267803 A1* | 8/2020 | Kwak | H04L 5/0007 |
| 2023/0092324 A1* | 3/2023 | Seidel | H04W 74/0833 |
| | | | 370/329 |
| 2023/0180300 A1* | 6/2023 | Lin | H04W 74/0891 |
| | | | 370/329 |
| 2023/0180301 A1* | 6/2023 | Seidel | H04W 74/006 |
| | | | 370/329 |
| 2024/0008064 A1* | 1/2024 | Lee | H04W 74/0833 |

(Continued)

FOREIGN PATENT DOCUMENTS

| | | | |
|---|---|---|---|
| CN | 108271213 A | 7/2018 | |
| CN | 111869304 A | 10/2020 | |
| WO | WO-2018/059185 A1 | 4/2018 | |

OTHER PUBLICATIONS

Extended European Search Report for EP Appl. No. 21953783.4, dated Apr. 12, 2024 (11 pages).

(Continued)

*Primary Examiner* — Abdullahi Ahmed
(74) *Attorney, Agent, or Firm* — Foley & Lardner LLP

(57) ABSTRACT

Systems and methods for wireless communication systems are disclosed. In one aspect, the wireless communication method includes identifying, by a wireless communication device, a plurality of Physical Random Access Channel (PRACH) resource configurations. The method includes sending, by the wireless communication device to a wireless communication node, based on a selected one of the plurality of PRACH resource configurations, a first message to initiate a random access process.

19 Claims, 11 Drawing Sheets

(56)     References Cited

U.S. PATENT DOCUMENTS

| | | | |
|---|---|---|---|
| 2024/0098796 A1* | 3/2024 | Miao ................... | H04B 7/1853 |
| 2025/0016837 A1* | 1/2025 | Sedin ................... | H04L 5/0094 |

OTHER PUBLICATIONS

Huawei et al., "RAN1 aspects of RedCap UE type and identification", 3GPP TSG RAN WG1 Meeting #106-e, R1-2106462, Aug. 27, 2021, E-meeting (6 pages).
ZTE et al., "On the remaining issues of 2-step RACH procedures", 3GPP TSG RAN WG1 Meeting #98, R1-1908182, Aug. 30, 2019, Prague, CZ (19 pages).
International Search Report and Written Opinion for PCT Appl. No. PCT/CN2021/113697, mailed May 20, 2022 (8 pages).

* cited by examiner

306

302

304

316   318   320

312

314   322

700

Identify a plurality of Physical random Access Channel (PRACH) resource configuration

702

Send, based on a selected one of the plurality of PRACH resource configurations, a first message to initiate a random access process to a wireless communication node

704

800

Determine a plurality of Physical Random Access Channel
(PRACH) resource configurations

802

Receive, from a wireless communication device, a first
message initiating a random access process, the first
message configured based on a selected one of the plurality
of PRACH resource configurations

804

SYSTEMS AND METHODS FOR INITIAL ACCESS

CROSS-REFERENCE TO RELATED APPLICATION

This application claims the benefit of priority under 35 U.S.C. § 120 as a continuation of International Patent Application No. PCT/CN2021/113697, filed on Aug. 20, 2021, the disclosure of which is incorporated herein by reference in its entirety.

TECHNICAL FIELD

The disclosure relates generally to wireless communication, including but not limited to systems and methods of group common transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions (NFs), have been simplified with some of them being software based so that they could be adapted according to need.

SUMMARY

One aspect is a wireless communication method, including identifying, by a wireless communication device, a plurality of Physical Random Access Channel (PRACH) resource configurations. The method includes sending, by the wireless communication device to a wireless communication node, based on a selected one of the plurality of PRACH resource configurations, a first message to initiate a random access process.

In some embodiments, the step of identifying a plurality of PRACH resource configurations includes receiving, by the wireless communication device from the wireless communication node, a second message additionally—indicating at least one of: a plurality of preamble formats corresponding to the plurality of PRACH resource configurations, respectively; or time-domain configurations of a plurality of PRACH resources.

In some embodiments, the time-domain configurations of the plurality of PRACH resources include a scaling factor for a period of each of the plurality of PRACH resources.

In some embodiments, the plurality of PRACH resource configurations has respective different starting positions in frequency-domain and/or respective different Frequency Division Multiplexing (FDM) numbers.

In some embodiments, a first one of the plurality of PRACH resource configurations is a subset of a second one of the plurality of PRACH resource configurations in frequency-domain.

In some embodiments, the step of identifying a plurality of PRACH resource configurations includes receiving, by the wireless communication device from the wireless communication node, a third message indicating a scaling factor for the first PRACH resource configuration.

In some embodiments, the step of identifying a plurality of PRACH resource configurations includes receiving, by the wireless communication device from the wireless communication node, a third message indicating a bitmap for the first PRACH resource configuration.

In some embodiments, the step of identifying a plurality of PRACH resource configurations includes receiving, by the wireless communication device from the wireless communication node, a third message indicating the first PRACH resource configuration as a first preconfigured number of occasions of the second PRACH resource configuration.

In some embodiments, the step of identifying a plurality of PRACH resource configurations includes receiving, by the wireless communication device from the wireless communication node, a third message indicating the first PRACH resource configuration as a last preconfigured number of occasions of the second PRACH resource configuration.

In some embodiments, the method further includes receiving, by the wireless communication device from the wireless communication node, a fourth message indicating priority levels of the plurality of PRACH resource configurations, respectively. The method includes selecting, by the wireless communication device, the selected PRACH resource configuration based on the priority levels.

In some embodiments, the priority levels are implicitly indicated by indices of the plurality of PRACH resource configurations, respectively.

In some embodiments, the priority levels are indicated by additional one or more bits associated with the plurality of PRACH resource configurations, respectively.

In some embodiments, the method further includes selecting, by the wireless communication device, the selected PRACH resource configuration based on a capability of the wireless communication device.

In some embodiments, the method further includes selecting, by the wireless communication device, the selected PRACH resource configuration based on a type of the wireless communication device.

In some embodiments, the method further includes receiving, by the wireless communication device from the wireless communication node, a fifth message indicating an order of the plurality of PRACH resource configurations. The method further includes selecting, by the wireless communication device, the selected PRACH resource configuration based on the order.

In some embodiments, the method further includes selecting, by the wireless communication device, the selected PRACH resource configuration based on a frequency-domain arrangement of the plurality of PRACH resource configurations. The method further includes sending, by the wireless communication device to the wireless communication node, the first message using the selected PRACH resource configuration.

In some embodiments, the method further includes selecting, by the wireless communication device, the selected PRACH resource configuration based on a time-domain arrangement of the plurality of PRACH resource configurations. The method further includes sending, by the wireless communication device to the wireless communication node, the first message using the selected PRACH resource configuration.

In some embodiments, the method further includes after sending a plurality of the first messages using all the plurality of PRACH resource configurations, monitoring, by the wireless communication device from the wireless communication node, a response message to one or more of the plurality of the first messages.

In some embodiments, the method further includes after sending a plurality of the first messages using some of the plurality of PRACH resource configurations, monitoring, by the wireless communication device from the wireless communication node, a response message to one or more of the plurality of the first messages. The method further includes, in response to receiving the response message, stopping, by the wireless communication device, sending the first message using the rest of the plurality of PRACH resource configurations.

In some embodiments, the method further includes after sending each of a plurality of the first messages using one of the plurality of PRACH resource configurations, monitoring, by the wireless communication device from the wireless communication node, a response message to the first messages. The method further includes, in response to receiving the response message, stopping, by the wireless communication device, sending the first message using the rest of the plurality of PRACH resource configurations.

In some embodiments, the method further includes (i) sending, by the wireless communication device to the wireless communication node, the first message using one of the plurality of PRACH resource configurations that is associated with a highest priority level, (ii) monitoring, by the wireless communication device from the wireless communication node, a response message to the first messages, (iii) repeating, by the wireless communication device, the step (i) and step (ii) for a predetermined number of time, (iv) determining that no response message is received, and (v) sending, by the wireless communication device to the wireless communication node, the first message using another of the plurality of PRACH resource configurations that is associated with a next highest priority level.

In some embodiments, the method further includes ramping, by the wireless communication device, for each of the plurality of PRACH resource configurations, power to send the first message.

Another aspect is a wireless communication apparatus including at least one processor and memory, wherein the at least one processor is configured to read code from the memory and implement a method. The method includes identifying, by a wireless communication device, a plurality of PRACH resource configurations; and sending, by the wireless communication device to a wireless communication node, based on a selected one of the plurality of PRACH resource configurations, a first message to initiate a random access process.

A computer program product including a computer-readable program medium code stored thereupon, the code, when executed by at least one processor, causing the at least one processor to implement a method. The method includes identifying, by a wireless communication device, a plurality of PRACH resource configurations; and sending, by the wireless communication device to a wireless communication node, based on a selected one of the plurality of PRACH resource configurations, a first message to initiate a random access process.

Another aspect is a wireless communication method, including: determining, by a wireless communication node, a plurality of PRACH resource configurations; and receiving, by the wireless communication node from a wireless communication device, a first message initiating a random access process, wherein the first message is configured based on a selected one of the plurality of PRACH resource configurations.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
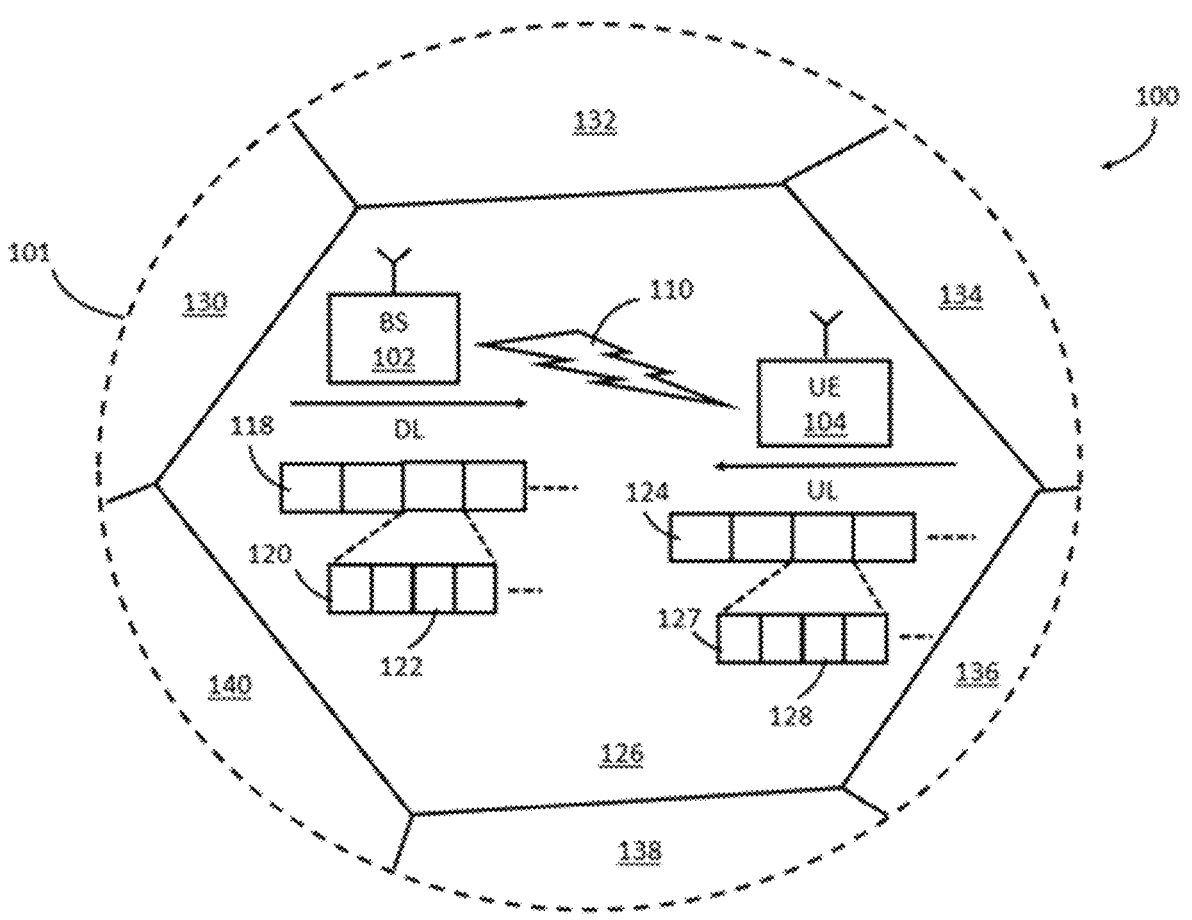
FIG. 1 illustrates an example wireless communication system in which techniques disclosed herein can be implemented, in accordance with some embodiments of the present disclosure.

FIG. 1 illustrates an example wireless communication system 100 in which techniques disclosed herein can be implemented, in accordance with some embodiments of the present disclosure. In the following discussion, the wireless communication system 100 may implement any wireless network, such as a cellular network or a narrowband Internet of things (NB-IoT) network. Such an example system 100 includes a base station (BS) 102 (also referred to as a wireless communication node) and UE 104 (also referred to as a wireless communication device) that can communicate with each other via a communication link 110 (e.g., a wireless communication channel), and a cluster of cells 126, 130, 132, 134, 136, 138 and 140 overlaying a geographical area 101. In some examples, a network refers to one or more BSs (e.g., the BS 102) in communication with the UE 104, as well as backend entities and functions (e.g., a LMF). In other words, the network refers to components of the system 100 other than the UE 104. In FIG. 1, the BS 102 and UE 104 are included within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
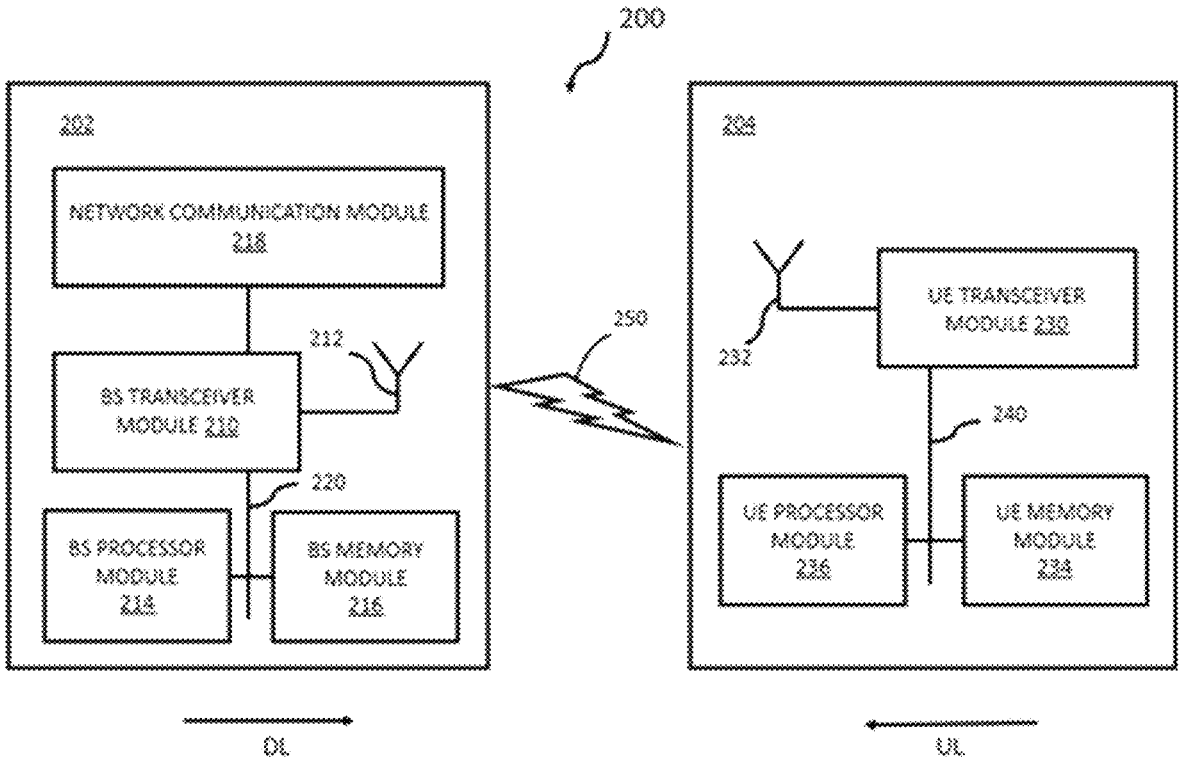
FIG. 2 illustrates a block diagram of an example wireless communication system for transmitting and receiving wireless communication signals (e.g., orthogonal frequency-division multiplexing (OFDM) or orthogonal frequency-division multiple access (OFDMA) signals) in accordance with some embodiments of the present disclosure.

FIG. 2 illustrates a block diagram of an example wireless communication system 200 for transmitting and receiving wireless communication signals (e.g., OFDM or OFDMA signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the system 100 of FIG. 1, as described above.

System 200 generally includes a base station 202 (here-inafter "BS 202") and a user equipment device 204 (here-inafter "UE 204"). The BS 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this inter-changeability and compatibility of hardware, firmware, and software, various illustrative components, blocks, modules, circuits, and steps are described generally in terms of their functionality. Whether such functionality is implemented as hardware, firmware, or software can depend upon the par-ticular application and design constraints imposed on the overall system. Those familiar with the concepts described herein may implement such functionality in a suitable man-ner for each particular application, but such implementation decisions should not be interpreted as limiting the scope of the present disclosure In accordance with some embodiments, the UE trans-ceiver 230 may be referred to herein as an "uplink" trans-ceiver 230 that includes a radio frequency (RF) transmitter and a RF receiver each including circuitry that is coupled to the antenna 232. A duplex switch (not shown) may alterna-tively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each including circuitry that is coupled to the antenna 212. A downlink duplex switch may alternatively couple the downlink trans-mitter or receiver to the downlink antenna 212 in time duplex fashion. The operations of the two transceiver mod-ules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the opera-tions of the two transceivers 210 and 230 may be coordi-nated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can sup-port a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communica-tion protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hard-ware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respec-tively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a MAC layer. In some embodiments, a third layer may be a Radio Link Control (RLC) layer. In some embodiments, a fourth layer may be a Packet Data Convergence Protocol (PDCP) layer. In some embodiments, a fifth layer may be a RRC layer. In some embodiments, a sixth layer may be a Non Access Stratum (NAS) layer or an Internet Protocol (IP) layer, and the seventh layer being the other layer.

In the legacy system, the PRACH configuration is done per cell with the same PRACH format, which is determined by the target coverage of one cell. However, with the improvement on the cell performance of a normal coverage 302 after the introduction of additional entity 304, e.g., relay, repeater or RIS, the valid coverage range of one cell will be extended 306, and whether such functionality will be enabled or not is also dependent on the implementation or OAM controlling.

Figure 3A:
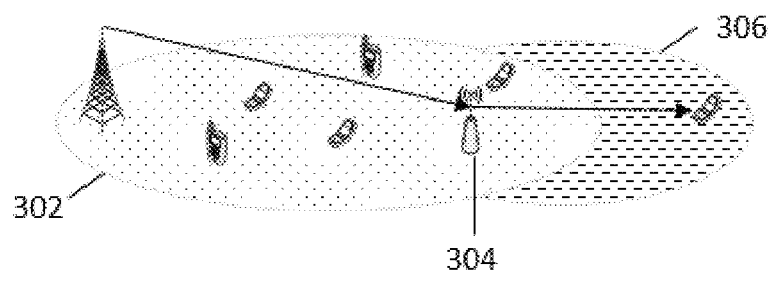
FIGS. 3A and 3B illustrates example coverages of a legacy PRACH configuration, in accordance with some embodiments.

In this case, there are at least two issues should be addressed. First, referring to FIG. 3A, within one cell, if the PRACH configuration is done under the assumption with extended coverage, with imbalance on the UE distribution, e.g., lower number for cell edge and larger number for normal coverage, the overall efficiency will be limited.

Figure 3B:
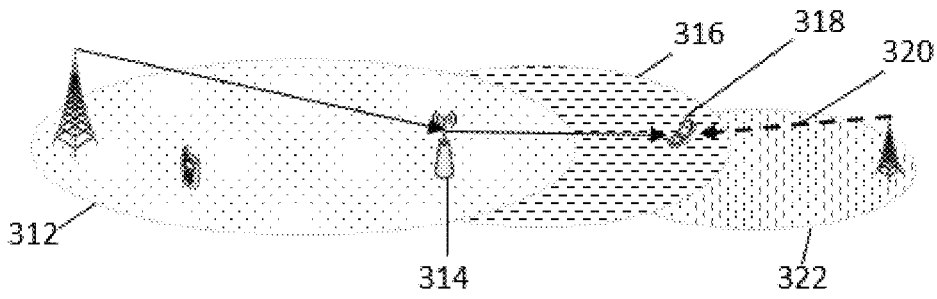

Second, referring to FIG. 3B, for all cells, if the PRACH configuration is done with assumption of normal coverage 312, one UE 318 (in an extended coverage area 316) will try to attach the far-cell with deployment of additional entity 314 since the signal quality of received downlink (DL) signal (e.g., reference signal received power (RSRP)) will be better than the near cell. In this way, since the configured PRACH format for the far-cell is not able to support the access for UE in far region 322, the UE will not access the network even with continuous trying 320.

The present disclosure can be applicable for another case in non-terrestrial networks (NTNs), e.g., one cell can serve the UE with/without pre-compensation capability. For example, if the UE is capable of compensating the delay and a Doppler effect (introduced by the high mobility of satellite and larger round trip time (RTT)) before the initial access, the legacy PRACH format (e.g., 5G NR Rel-17 design) can be reused. However, for the case without pre-compensation, a new PRACH format, e.g., with different preamble design, can be used. For the system to enable the service for all UE types, multiple configurations or the same configuration with different parameters may be needed.

In this way, the required PRACH configuration will be different (e.g., preamble format).

In current spec, there are following ways to differentiate the different PRACH configurations:

Within one PRACH configuration, the preamble index is divided into two groups: Group A and group B (as marked in yellow below).

The UE will select the corresponding preamble index within one group based on the assumption of payload size for following Msg3.

The IE RACH-ConfigCommon can be used to specify the cell specific random-access parameters.

RACH-ConfigCommon information element

```
-- ASN1START
-- TAG-RACH-CONFIGCOMMON-START
RACH-ConfigCommon ::=                                    SEQUENCE {
    rach-ConfigGeneric                                       RACH-ConfigGeneric,
    totalNumberOfRA-Preambles                                INTEGER (1..63)
OPTIONAL, -- Need S
    ssb-perRACH-OccasionAndCB-PreamblesPerSSB                CHOICE {
        oneEighth                                                ENUMERATED
{n4, n8, n12, n16, n20, n24, n28, n32, n36, n40, n44, n48, n52, n56, n60, n64},
        oneFourth                                                ENUMERATED
{n4, n8, n12, n16, n20, n24, n28, n32, n36, n40, n44, n48, n52, n56, n60, n64},
        oneHalf                                                  ENUMERATED
```

-continued

```
{n4, n8, n12, n16, n20, n24, n28, n32, n36, n40, n44, n48, n52, n56, n60, n64},
        one                                                  ENUMERATED
{n4, n8, n12, n16, n20, n24, n28, n32, n36, n40, n44, n48, n52, n56, n60, n64},
        two                                                  ENUMERATED
{n4, n8, n12, n16, n20, n24, n28, n32},
        four                                                 INTEGER (1..16),
        eight                                                INTEGER (1..8),
        sixteen                                              INTEGER (1..4)
    }
OPTIONAL, -- Need M
    groupBconfigured                                SEQUENCE {
        ra-Msg3SizeGroupA                               ENUMERATED {
b56, b144, b208, b256, b282, b480, b640, b800, b1000, b72,
spare6, spare5, spare4, spare3, spare2, spare1},
        messagePowerOffsetGroupB                        ENUMERATED {
minusinfinity, dB0, dB5, dB8, dB10, dB12, dB15, dB18},
        numberOfRA-PreamblesGroupA                      INTEGER (1..64)
    }
OPTIONAL, -- Need R
    ra-ContentionResolutionTimer                    ENUMERATED { sf8,
sf16, sf24, sf32, sf40, sf48, sf56, sf64},
    rsrp-ThresholdSSB                               RSRP-Range
OPTIONAL, -- Need R
    rsrp-ThresholdSSB-SUL                           RSRP-Range
OPTIONAL, -- Cond SUL
    prach-RootSequenceIndex                         CHOICE {
        1839                                            INTEGER (0..837),
        1139                                            INTEGER (0..137)
    },
    msg1-SubcarrierSpacing                          SubcarrierSpacing
OPTIONAL, -- Cond L139
    restrictedSetConfig                             ENUMERATED {
unrestrictedSet, restrictedSetTypeA, restrictedSetTypeB},
    msg3-transformPrecoder                          ENUMERATED {enabled}
OPTIONAL, -- Need R
    ...,
    [[
    ra-PrioritizationForAccessIdentity-r16          SEQUENCE {
        ra-Prioritization-r16                           RA-Prioritization,
        ra-PrioritizationForAI-r16                      BIT STRING (SIZE (2))
    }
OPTIONAL, -- Cond InitialBWP-Only
    prach-RootSequenceIndex-r16                     CHOICE {
        1571                                            INTEGER (0..569),
        11151                                           INTEGER (0..1149)
    } OPTIONAL -- Need R
    ]]
}
```

For IoT-UE, different PRACH configuration can be introduced per coverage extension (CE) level. And UE can conduct the corresponding selection based on the UE's own implementation, e.g., DL RSRP measurement.

```
PRACH-ParametersListCE-r13 ::=             SEQUENCE (SIZE (1..maxCE-Level-r13) ) OF
PRACH-ParametersCE-r13
PRACH-ParametersCE-r13 ::=                     SEQUENCE {
    prach-ConfigIndex-r13                          INTEGER (0..63),
    prach-FreqOffset-r13                           INTEGER (0..94),
    prach-StartingSubframe-r13                     ENUMERATED {sf2, sf4,
sf8, sf16, sf32, sf64, sf128,
    sf256}                                     OPTIONAL, -- Need OP
    maxNumPreambleAttemptCE-r13
                                                   ENUMERATED {n3, n4, n5, n6,
n7, n8, n10}                                OPTIONAL, -- Need OP
    numRepetitionPerPreambleAttempt-r13            ENUMERATED
{n1, n2, n4, n8, n16, n32, n64, n128},
    mpdcch-NarrowbandsToMonitor-r13                SEQUENCE (SIZE(1..2))
OF
    INTEGER (1..maxAvailNarrowBands-r13),
    mpdcch-NumRepetition-RA-r13                    ENUMERATED {r1, r2, r4,
r8, r16,
    r32, r64, r128, r256},
    prach-HoppingConfig-r13                        ENUMERATED {on,off}
}
RACH-CE-LevelInfo-r13 ::=                      SEQUENCE {
    preambleMappingInfo-r13                        SEQUENCE {
        firstPreamble-r13                              INTEGER (0..63),
```

-continued

```
    lastPreamble-r13                              INTEGER (0..63)
    },
    ra-ResponseWindowSize-r13                     ENUMERATED {sf20, sf50, sf80,
sf120, sf180,
sf240, sf320, sf400},
    mac-ContentionResolutionTimer-r13             ENUMERATED {sf80, sf100, sf120,
    sf160, sf200, sf240, sf480, sf960},
    rar-HoppingConfig-r13                         ENUMERATED {on,off},
    ...,
    [[ edt-Parameters-r15                         SEQUENCE {
        edt-LastPreamble-r15                      INTEGER (0..63),
        edt-SmallTBS-Enabled-r15                  BOOLEAN,
        edt-TBS-r15                               ENUMERATED {b328, b408, b504,
b600, b712,
                                                       b808,
b936, b1000or456},
        mac-ContentionResolutionTimer-r15         ENUMERATED {sf240,
sf480, sf960,
    sf1920, sf3840, sf5760, sf7680, sf10240}      OPTIONAL -- Need OP
        } OPTIONAL                                -- Cond EDT
    ]]
}
```

Moreover, the following information to define the prioritized access can be introduced:

```
    ra-PrioritizationForAccessIdentity-r16        SEQUENCE {
        ra-Prioritization-r16                     RA-Prioritization,
        ra-PrioritizationForAI-r16                BIT STRING (SIZE (2))
RA-Prioritization ::=                             SEQUENCE {
    powerRampingStepHighPriority                  ENUMERATED {dB0, dB2, dB4, dB6},
    scalingFactorBI                               ENUMERATED {zero, dot25, dot5, dot75}
OPTIONAL, -- Need R
    ...
}
```

However, this method may introduce additional power scale parameter to improve the detection of PRACH preamble for certain purpose, and it may not be aligned prioritization of the selection of certain PRACH configuration for accessing.

In the present disclosure, additional PRACH enhancement including differentiation on the random access channel (RACH) resource with new criteria and signaling, priority indication and back-off mechanism can be defined (or identified or determined).

Configuration of Multiple PRACH Settings

Figure 4:
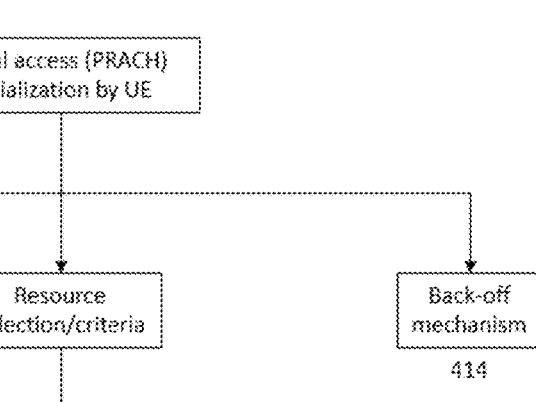
FIG. 4 illustrates a diagram of various methods of initial access, in accordance with some embodiments.

Referring to FIG. 4, a new PRACH configuration by one or more cases and/or options 400 can be indicated to the UE.

Referring to case 402, an additional signaling (IE as prach-ConfigIndex) can be introduced to indicate the following content. For example, the different preamble format can be indicated, and the new PRACH format can be specified. For example, the different PRACH resource in time domain can be configured. For example, "additional" signaling can refer to the case where one additional (e.g., independent) signaling is used to configure the new PRACH. In another example, "additional" signaling can refer to the case where within the existing indication, more than one PRACH configurations are included.

For a PRACH resource configuration in the time domain, the scaling factor of period of RACH resource in time domain can be considered. For example, with additional offset, e.g., frame offset or slot offset, can be considered.

Figure 5A:
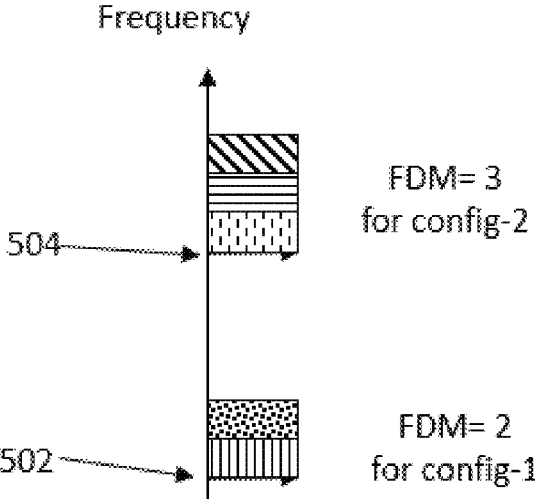
FIGS. 5A and 5B illustrate diagrams of multiple PRACH resource configurations in the frequency domain, according to some embodiments.

Referring to case 404, and referring to FIG. 5A, for the PRACH resource (occasion) configuration in the frequency domain, different frequency start and/or FDM number for new PRACH configuration can be used. For example, there can be 2 FDMs for a first configuration at a first starting frequency 502 (config-1), and there can be 3 FDMs for a second configuration at a second starting frequency 504 (config-2).

Figure 5B:
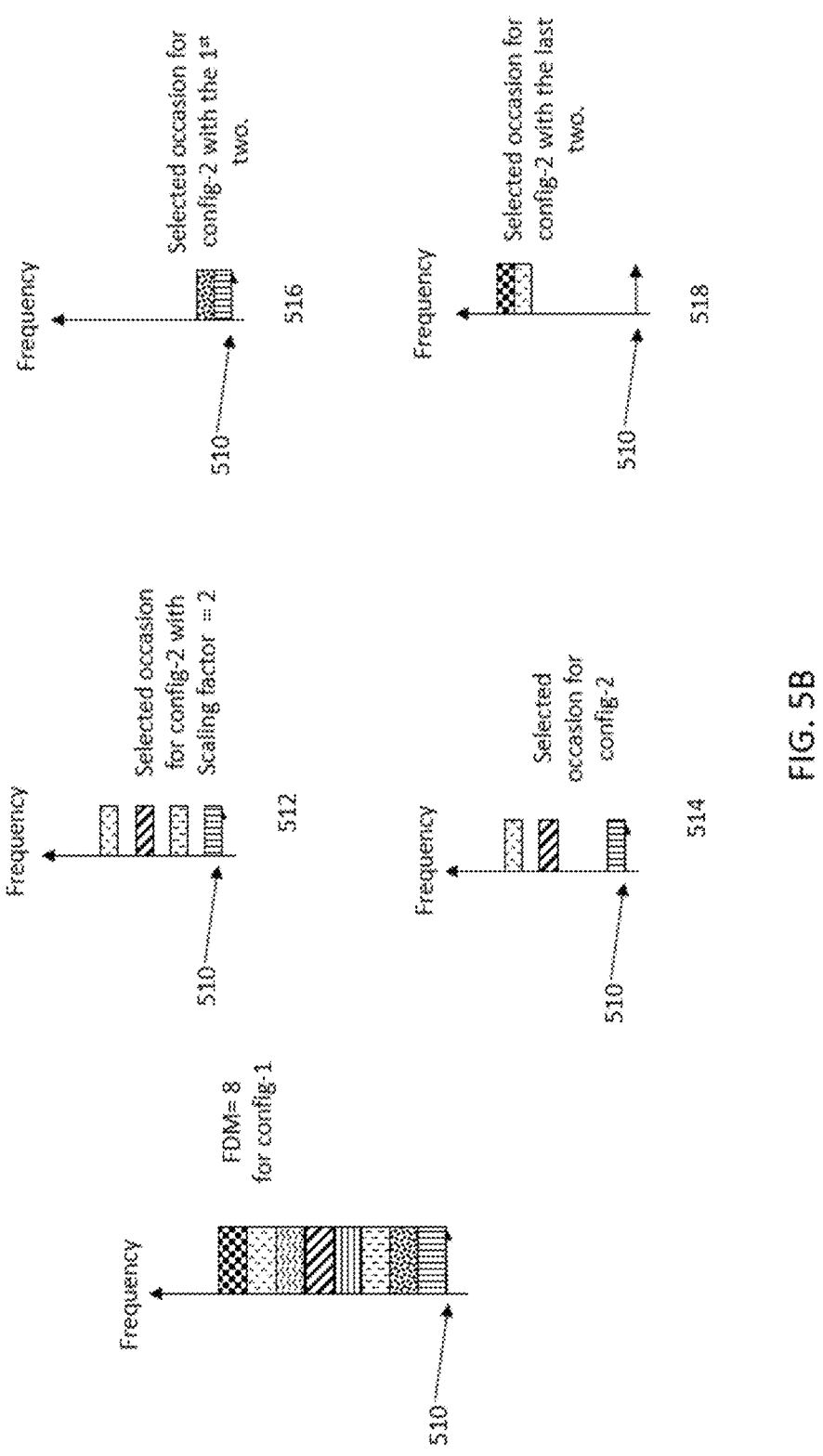

Referring to FIG. 5B, a selection of subset in frequency domain with additional indication of new parameters can be considered. A subset of RACH occasion(s) of PRACH configuration-1 at starting frequency 510 can be selected for PRACH configuration-2 with at least following options:

For option 512, the scaling factor or sampling factor can be introduced. In this way, equaling sampled occasion will be assigned to the PRACH configuration-2. And starts of sampled resource can be fixed to the first one or with an additional indication of offset.

For option 514, the bit map for indication can be introduced. And the length of bitmap can be determined by the supported FDM number of reference configuration, e.g., configuration-1 in this example.

For option 516, the first X (e.g., 2) occasions can be selected for another configuration.

For option 518, the last X (e.g., 2) occasions can be selected for another configuration.

Referring to FIG. 4, for case 406, selection of different PRACH occasion for transmission can be used. The ssb-perRACH-OccasionAndCB-PreamblesPerSSB can be introduced to map the synchronization signal block (SSB) to PRACH occasion and preamble. Then, after detection of SSB with corresponding index, the UE can initialize the transmission of PRACH on certain occasion.

For the case with multiple PRACH configuration (cases 402-406), an additional configuration(s) of this parameter can be considered.

Resource Configuration

With reception of different PRACH configurations, the UE can conduct the PRACH transmission based on the selection of RACH resource. Following cases can be considered to give the guidance for resource selection.

Referring to FIG. 4, in a first case 408, the priority indication from the BS can be considered. The gNB can indicate the priority level for each configuration, and the UE can try to conduct the PRACH transmission according to the priority level.

The indication of priority level can be done with two methods. In a first method, the priority level can be implicitly indicated by the index of configuration. For example, if all configurations are done in a list, the ID of configuration in this list can refer to the priority level. In a second method, the priority level can be indicated by a new parameter, e.g., in case of one bit, 0 can refer to the lower level and 1 can be the higher level.

This parameter can be indicated per configuration. If the same value is shared among configurations, they can be in the same level.

This parameter can be configured for one configuration with the higher level. Without this value, the normal or lower level can be expected.

Referring to FIG. 4, in a second case 410, the UE's capability and PRACH configuration can be considered. In this case, the gNB can configure the different PRACH configuration with a different preamble format, and the UE can select the configuration based on the UE's own capability. For example, when there is good capability and accuracy for pre-compensation, the RACH configuration with normal preamble can be selected. Otherwise, RACH configuration with advanced/enhanced preamble can be selected.

Referring to FIG. 4, in a third case 412, the indicated order of configuration can be considered. In this case, with indication of multiple configuration, the gNB may indicate the order for transmission. If the UE has failed to access the network by 1st RACH configuration, the transmission based on the next configuration can be used.

Back-Off Mechanism or Enhanced Procedure for Accessing.

With multiple configurations, the UE may try to attempt the network via one of them. However, since the initial access can fail due to congestion or improper selection of RACH. a back-off mechanism 414 can be used (FIG. 4).

Figure 6A:
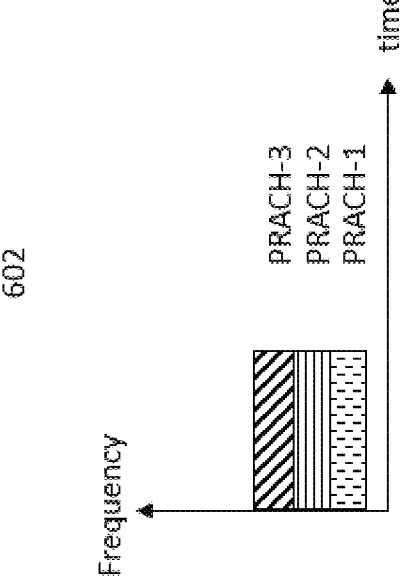
FIGS. 6A, 6B, 6C, 6D, and 6E illustrate diagrams of back-off mechanism or enhanced procedures for accessing, according to some embodiments.

Referring to FIG. 6A, when there multiple PRACH configurations, once the PRACH resource configuration is available, the UE can transmit the PRACH with FDM at the same time (602).

Figures 6B, 6C:
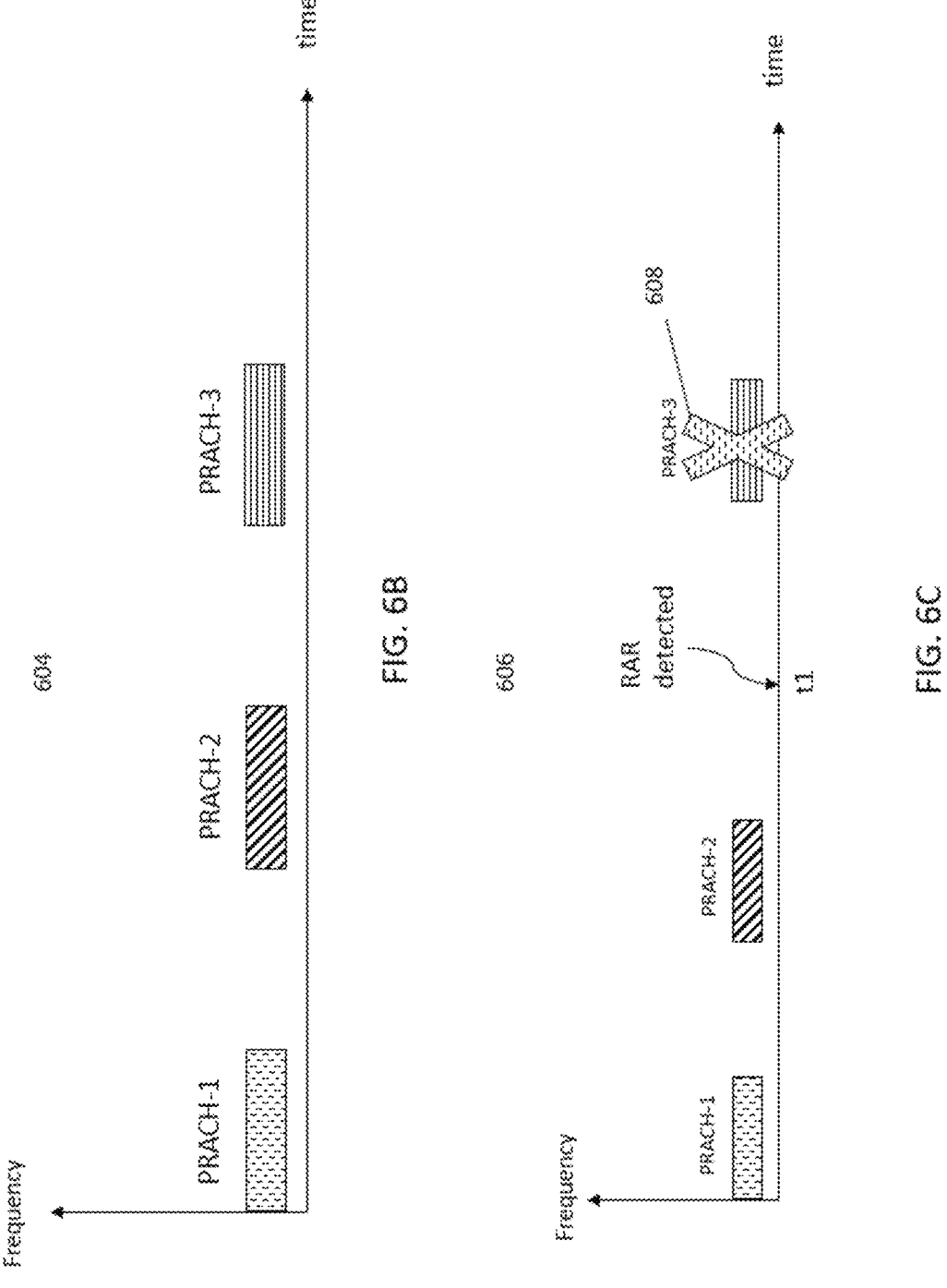

Referring to FIG. 6B, when there are multiple PRACH configurations, once the PRACH resource configuration is available, the UE can transmit the PRACH with time division multiplexing (TDM) (604). In a first option 604, all PRACHs can be transmitted consecutively over the RACH occasion without waiting for the reception of response from BS. After transmission of all PRACH configurations (e.g., different preamble format), the UE can start to monitor the random access response (RAR). The RAR window can start after the transmission of the last PRACH. Then, the UE can try to detect the RAR after all transmissions.

Referring to FIG. 6C, there may be a gap over the time domain between consecutive transmissions, and the UE can wait for the response. In this way, if the RAR is detected at the UE side, the UE does not attempt (608) to transmit other PRACH.

Figures 6D, 6E:
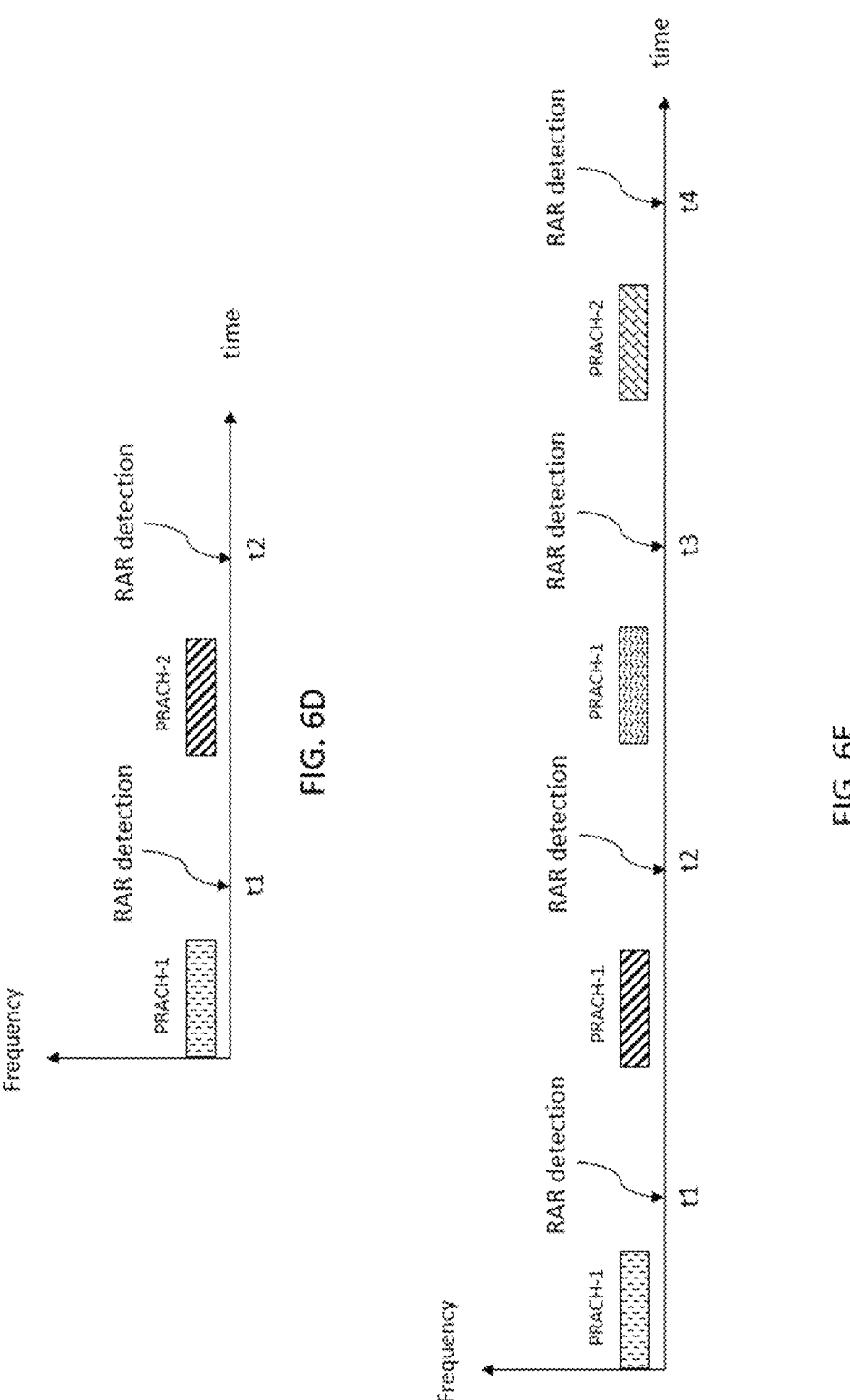

Referring to FIG. 6D, for each PRACH transmission, the UE can monitor for the RAR from the BS within the corresponding RAR window. Once the RAR is detected, the UE can terminate the remaining PRACH transmissions. New transmissions according to the PRACH configuration can be done consecutively.

Referring to FIG. 6E, with indication of priority level, the UE can try to access the network by sending the prioritized PRACH multiple times (e.g., as indicated by preamble-TransMax). For each transmission, the UE can try to decode the RAR window as legacy UE. Once the attempts is failed for the prioritized level, the UE can transmit the RACH with the next level.

As another option, for each transmission, the power ramping can be applied for the preamble transmission within same configuration.

Figure 7:
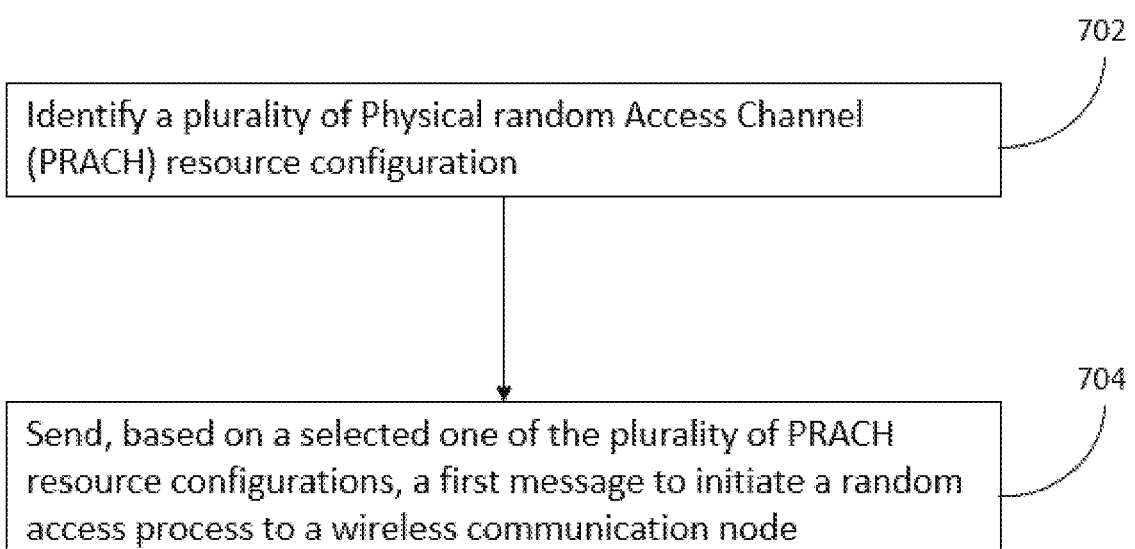
FIGS. 7 and 8 illustrate flow charts of example wireless communication processes in accordance with some embodiments of the present disclosure.
Figure 8:
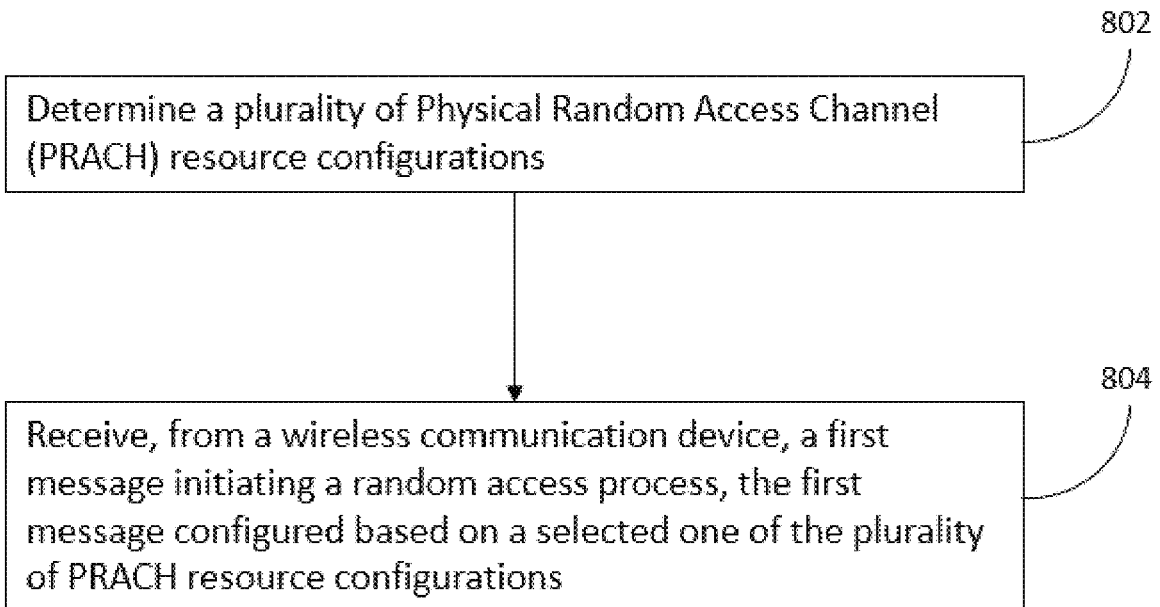

FIGS. 7-8 illustrate flow charts of example wireless communication processes, in accordance with some embodiments. Although each of the flow charts show a certain order, embodiments are not limited thereto, and the order of operations of the processes may be changed in any suitable manner.

FIG. 7 illustrates a flow chart of an example wireless communication process 700 according to some embodiments. The process 700 is performed by the UE. The process 700 includes identifying, by a wireless communication device, a plurality of PRACH resource configurations (702). The process 700 includes sending, to a wireless communication node, based on a selected one of the plurality of PRACH resource configurations, a first message to initiate a random access process (704).

In some embodiments, process 700 includes receiving, from the wireless communication node, a fourth message indicating priority levels of the plurality of PRACH resource configurations, respectively. The process 700 can include selecting the selected PRACH resource configuration based on the priority levels.

In some embodiments, process 700 includes selecting the selected PRACH resource configuration based on a capability of the wireless communication device.

In some embodiments, process 700 includes selecting the selected PRACH resource configuration based on a type of the wireless communication device. In the network, a new type of terminal, e.g., repeater or smart repeater or specialized mobile radio (SMR)-UE, can be defined as one UE type. During the procedure for initial access between this new terminal and the BS, the specific RACH resource (e.g., occasion) can be defined by the BS. Then, the UE can initialize the access procedure by selecting corresponding RACH occasion, with a pre-defined preamble or specific preamble indicated by the BS. Here, the pre-defined preamble may refer to the preamble which is pre-stored or pre-allocated to each repeater. In general, this can be done by implementation.

In some embodiments, process 700 includes receiving, from the wireless communication node, a fifth message indicating an order of the plurality of PRACH resource configurations, and selecting the selected PRACH resource configuration based on the order.

In some embodiments, process 700 includes selecting the selected PRACH resource configuration based on a frequency-domain arrangement of the plurality of PRACH resource configurations, and sending, to the wireless communication node, the first message using the selected PRACH resource configuration.

In some embodiments, process 700 includes selecting the selected PRACH resource configuration based on a time-domain arrangement of the plurality of PRACH resource configurations, and sending, to the wireless communication node, the first message using the selected PRACH resource configuration.

In some embodiments, process 700 includes, after sending a plurality of the first messages using all the plurality of PRACH resource configurations, monitoring, from the wireless communication node, a response message to one or more of the plurality of the first messages.

In some embodiments, process 700 includes, after sending a plurality of the first messages using some of the plurality of PRACH resource configurations, monitoring, from the wireless communication node, a response message to one or more of the plurality of the first messages. The process 700 can include, in response to receiving the response message, stopping sending the first message using the rest of the plurality of PRACH resource configurations.

In some embodiments, process 700 includes, after sending each of a plurality of the first messages using one of the plurality of PRACH resource configurations, monitoring, from the wireless communication node, a response message to the first messages. The process 700 can include, in response to receiving the response message, stopping sending the first message using the rest of the plurality of PRACH resource configurations.

In some embodiments, process 700 includes (i) sending, to the wireless communication node, the first message using one of the plurality of PRACH resource configurations that is associated with a highest priority level, (ii) monitoring, from the wireless communication node, a response message to the first messages, (iii) repeating the step (i) and step (ii) for a predetermined number of time, (iv) determining that no response message is received, and (v) sending, to the wireless communication node, the first message using another of the plurality of PRACH resource configurations that is associated with a next highest priority level.

In some embodiments, process 700 includes ramping, for each of the plurality of PRACH resource configurations, power to send the first message.

FIG. 8 illustrates a flow chart of an example wireless communication process 800 according to some embodiments. The process 800 is performed by the TRP. The process 800 includes determining a plurality of PRACH resource configurations (802). The process 800 includes receiving, from a wireless communication device, a first message initiating a random access process, the first message configured based on a selected one of the plurality of PRACH resource configurations (804).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules. However, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A wireless communication method, comprising:
identifying, by a wireless communication device, a plurality of Physical Random Access Channel (PRACH) resource configurations;
selecting, by the wireless communication device, a PRACH resource configuration based on at least one of a frequency-domain arrangement or a time-domain arrangement of the plurality of PRACH resource configurations; and
sending, by the wireless communication device to a wireless communication node, based on the selected PRACH resource configuration of the plurality of PRACH resource configurations, a first message to initiate a random access process.

2. The method of claim 1, wherein identifying the plurality of PRACH resource configurations comprises receiving, by the wireless communication device from the wireless communication node, a second message additionally indicating at least one of: a plurality of preamble formats corresponding to the plurality of PRACH resource configurations, respectively; or time-domain configurations of a plurality of PRACH resources.

3. The method of claim 2, wherein the time-domain configurations of the plurality of PRACH resources include a scaling factor for a period of each of the plurality of PRACH resources.

4. The method of claim 1, wherein the plurality of PRACH resource configurations has at least one of: respective different starting positions in frequency-domain or respective different Frequency Division Multiplexing (FDM) numbers.

5. The method of claim 1, wherein a first one of the plurality of PRACH resource configurations is a subset of a second one of the plurality of PRACH resource configurations in frequency-domain.

6. The method of claim 5, wherein identifying the plurality of PRACH resource configurations comprises receiving, by the wireless communication device from the wireless communication node, a third message indicating a scaling factor for the first PRACH resource configuration.

7. The method of claim 5, wherein identifying the plurality of PRACH resource configurations comprises receiving, by the wireless communication device from the wireless communication node, a third message indicating a bitmap for the first PRACH resource configuration.

8. The method of claim 5, wherein identifying the plurality of PRACH resource configurations comprises receiving, by the wireless communication device from the wireless communication node, a third message indicating the first PRACH resource configuration as a first preconfigured number of occasions of the second PRACH resource configuration.

9. The method of claim 5, wherein identifying the plurality of PRACH resource configurations comprises receiving, by the wireless communication device from the wireless communication node, a third message indicating the first PRACH resource configuration as a last preconfigured number of occasions of the second PRACH resource configuration.

10. The method of claim 1, further comprising:
receiving, by the wireless communication device from the wireless communication node, a fourth message indicating priority levels of the plurality of PRACH resource configurations, respectively; and
selecting, by the wireless communication device, the selected PRACH resource configuration based on the priority levels.

11. The method of claim 10, wherein the priority levels are implicitly indicated by indices of the plurality of PRACH resource configurations, respectively.

12. The method of claim 10, wherein the priority levels are indicated by additional one or more bits associated with the plurality of PRACH resource configurations, respectively.

13. The method of claim 1, further comprising:
selecting, by the wireless communication device, the selected PRACH resource configuration based on a capability of the wireless communication device.

14. The method of claim 1, further comprising:
selecting, by the wireless communication device, the selected PRACH resource configuration based on a type of the wireless communication device.

15. The method of claim 1, further comprising:
receiving, by the wireless communication device from the wireless communication node, a fifth message indicating an order of the plurality of PRACH resource configurations; and
selecting, by the wireless communication device, the selected PRACH resource configuration based on the order.

16. The method of claim 1, further comprising:
sending, by the wireless communication device to the wireless communication node, the first message using the selected PRACH resource configuration.

17. A wireless communication method, comprising:

determining, by a wireless communication node, a plurality of Physical Random Access Channel (PRACH) resource configurations;

receiving, by the wireless communication node from a wireless communication device, a PRACH resource configuration selected from the plurality of PRACH resource configurations based on at least one of a frequency-domain arrangement or a time-domain arrangement of the plurality of PRACH resource configurations; and receiving, by the wireless communication node from the wireless communication device, a first message initiating a random access process, wherein the first message is configured based on a selected PRACH resource configuration of the plurality of PRACH resource configurations.

18. A wireless communication device, comprising:

at least one processor configured to:

identify a plurality of Physical Random Access Channel (PRACH) resource configurations;

select a PRACH resource configuration based on at least one of a frequency-domain arrangement or a time-domain arrangement of the plurality of PRACH resource configurations; and send, via a transmitter to a wireless communication node, based on the selected PRACH resource configuration of the plurality of PRACH resource configurations, a first message to initiate a random access process.

19. A wireless communication node, comprising:

at least one processor configured to:

determine a plurality of Physical Random Access Channel (PRACH) resource configurations;

receive, via a receiver from a wireless communication device, a PRACH resource configuration selected from the plurality of PRACH resource configurations based on at least one of a frequency-domain arrangement or a time-domain arrangement of the plurality of PRACH resource configurations; and receive, via the receiver from the wireless communication device, a first message initiating a random access process, wherein the first message is configured based on the selected PRACH resource configuration of the plurality of PRACH resource configurations.

* * * * *